United States Patent [19]
Karam

[11] Patent Number: 5,548,832
[45] Date of Patent: Aug. 20, 1996

[54] AUTOMATIC DISPLAY ILLUMINATION IN A RECEIVER

[75] Inventor: Anthony J. Karam, Irving, Tex.

[73] Assignee: Uniden America Corporation, Fort Worth, Tex.

[21] Appl. No.: 281,744

[22] Filed: Jul. 28, 1994

[51] Int. Cl.⁶ .................................................. H04B 1/16
[52] U.S. Cl. ..................... 455/226.4; 455/38.3; 455/343; 340/825.44
[58] Field of Search ................................. 455/38.2, 38.3, 455/38.4, 159.1, 159.2, 343, 226.4; 340/825.44

[56] References Cited

U.S. PATENT DOCUMENTS

| | | | |
|---|---|---|---|
| 4,129,869 | 12/1978 | Morineka | 343/6.8 R |
| 4,198,601 | 4/1980 | Ono et al. | 455/73 |
| 4,205,270 | 5/1980 | Okatani | 455/158 |
| 4,455,673 | 6/1984 | Topping | 381/12 |
| 4,536,761 | 8/1985 | Tsunoda et al. | 455/38.4 |
| 4,713,659 | 12/1987 | Oyagi et al. | 340/825.44 |
| 4,868,563 | 9/1989 | Stair et al. | 340/825.44 |
| 5,198,797 | 3/1993 | Daidoji | 340/425.5 |
| 5,398,022 | 3/1995 | Lipp | 340/825.44 |

FOREIGN PATENT DOCUMENTS 63-313920  12/1988  Japan ..................................... 455/343

*Primary Examiner*—Chi H. Pham
*Attorney, Agent, or Firm*—Daniel R. Brown

[57] ABSTRACT

A receiver is disclosed which includes an automatic display illumination capability. Upon the receipt of a signal, the display is illuminated until either an interval timer expires, or the signal goes away. In the preferred embodiment, a portable scanning receiver employs a liquid crystal display and an incandescent light. The automatic display capability can be enabled and disabled to a manual display illumination mode of operation. Benefits include improved ease of use in low ambient light conditions and improved battery life.

6 Claims, 2 Drawing Sheets

AUTOMATIC DISPLAY ILLUMINATION IN A RECEIVER

TECHNICAL FIELD OF THE INVENTION

This invention relates to radio receivers. In one embodiment, a portable receiver is disclosed wherein a liquid crystal display is automatically illuminated upon receipt of a radio signal.

BACKGROUND OF THE INVENTION

In recent years, there have been technical advancements in information display devices in portable electronic equipment. Display cost, size, legibility, and power consumption are particularly important parameters in display design. The liquid crystal display has proven to yield a good balance of these parameters as evidenced by the widespread use of such displays.

One disadvantage of a liquid crystal display is the fact that it is legible only in the presence of ambient light. To overcome this disadvantage, equipment manufacturers often incorporate a light source located adjacent to the display so as to make the display legible, even on low ambient light, or no ambient light conditions. Light emitting diodes, incandescent lamps, luminescent panels, and other light sources have been successfully employed for this purpose. The use of a light source contradicts the low power parameter of a display design. This is especially important in the design of portable equipment, such as portable radio receivers.

In portable equipment battery life is an important consideration. While the liquid crystal display has been a boon to equipment designers because of its effectiveness and low power consumption, the need for a light source to illuminate such a display is counter productive in terms of battery life. Various schemes have been devised to reduce the power consumption of such light sources, adding a user operated switch to control the illumination of the light source is one example.

Portable radio receivers, including portable scanning radio receivers, often employ displays which indicate the channel or frequency currently being received together with other operational information. The user of such a receiver has a need to view the display from time to time, but normally does not view the display continuously. Therefore, the illumination of the display need not be active continuously. It is especially useful to activate the display light source at the time a new signal is received in a scanning receiver so that the user can identify the broadcast being received.

It has been contemplated to activate the display light source coincidentally with the activation of the squelch signal output from the receiver. As such, the display light source would illuminate whenever the receiver squelch opened. This is not a completely satisfactory solution because sometimes the received signal which caused the squelch to open will remain active for an extended period of time, and cause needless current drain from the battery. In such a situation, the user need only view the display at the beginning of the signal reception. Further, such a scheme does not deal with the situation where there is sufficient ambient light to view the display, in which case, the display light source need not be illuminated at all.

SUMMARY OF THE INVENTION

In one embodiment, a portable scanning radio receiver is disclosed which includes a liquid crystal display with an incandescent backlight. The display indicates the presently received channel or frequency coincidentally with the activation of a signal present output from the receiver. The signal present output is a conventional squelch signal, but may alternatively be a tone coded squelch or digital squelch signal. In any case, the output has a first state indicating the presence of a received signal and a second state indicating the cessation of the received signal.

If an auto-light function is enabled, then a controller illuminates the backlight and starts an interval timer. The controller extinguishes the backlight at the occurrence of either the expiration of the interval timer or the cessation of the signal present output from the receiver.

The foregoing procedure provides display illumination at the occurrence of each newly received signal, for a duration of time up to the length of the interval timer, or the cessation of the received signal, whichever occurs first. In the preferred embodiment, the duration of the interval timer is ten seconds which gives the user ample time to view the display without unduly draining battery power.

The auto-light function serves well when there is inadequate ambient light to otherwise read the display. In situations where there is adequate ambient light, the auto-light function can be disabled by the user. Disabling of the auto-light function further conserves battery power and extends battery life. A light function key is provided on a keypad of the scanning receiver, in the preferred embodiment, and, an auto-light icon is provided on the display. The auto-light icon serves to indicate to the user whether the auto-light function is currently active or inactive.

While the auto-light function is inactive, a short press of the light key will illuminate the backlight and start the interval timer. The light will remain on for the duration of the interval timer and then extinguish. This is the manual mode of operation whereby the user can activate the backlight at will, for a period of time equal to the duration of the interval timer. Alternatively, if the user holds the light key down for a second period of time equal to or exceeding a second interval timer, then the controller will change the mode of operation of the light function from manual to auto-light. Coincidentally with the change of operation, the auto-light icon will be activated or deactivated corresponding to the activation and deactivation of the auto-light function.

BRIEF DESCRIPTION OF THE DRAWINGS

The features of the present invention which are believed to be novel are set forth with particularity in the appended claims. The invention, together with further objects and advantages thereof, may be best understood by making reference to the following description taken in conjunction with the accompanying drawings, in the several figures of which like reference numerals identify identical elements, and wherein:

DETAILED DESCRIPTION

Figure 1:
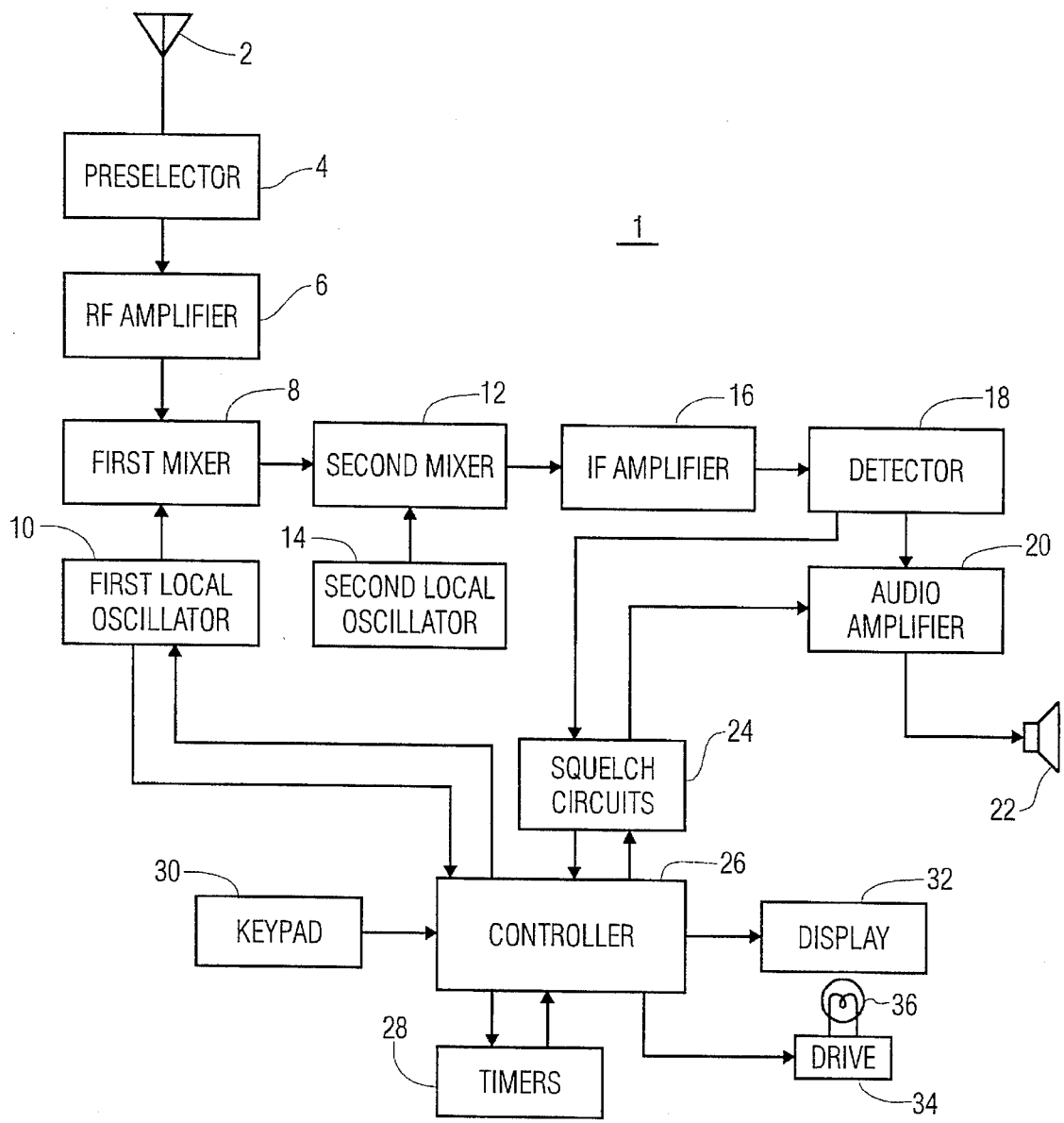
FIG. 1 is a functional block diagram of the receiver in the preferred embodiment.

Reference is directed to FIG. 1, which is a functional block diagram of a portable scanning radio receiver 1 in the preferred embodiment. The portable scanning radio receiver 1 is of conventional design including an antenna 2 for receiving radio signals. The antenna 2 is coupled to preselecter 4 which selects a band of frequencies which are coupled in turn to a radio frequency amplifier 6. The amplified output of radio frequency amplifier 6 is coupled to a first mixer 8. First mixer 8 receives a local oscillator signal from first local oscillator 10. The mixing of the received signal and the signal from the first local oscillator 10 combine and first mixer 8 produces a first intermediate frequency which is coupled to second mixer 12. First local oscillator 10 includes a phase lock loop frequency synthesizer which allows for frequency agility in the receiver. First local oscillator 10 also provides a synthesizer locked signal output to controller 25.

Second mixer 12 mixes the first intermediate frequency signal received from mixer 8 with a second local oscillator signal received from second local oscillator 14. The combined signals produce the second intermediate frequency output from second mixer 12. Intermediate frequency amplifier 16 amplifies the second intermediate frequency signal and provides an output to detector 18. Detector 18 provides a signal output indicative of the presence of a received signal via squelch circuits 24 to controller 26.

In the preferred embodiment, detector 18 utilizes a conventional squelch circuit which provides a signal indicating that a signal has been received based on carrier signal strength. However, the type of detector circuit 18 and squelch circuit 24 employed is irrelevant to the present invention. The detector circuit could detect a sub-audible tone such as in a continuous tone coded squelch system, or it could detect a digital squelch control signal, or other signal detection means.

The output of the detector circuit 18 couples to an audio amplifier 20 which provides an audio output signal to speaker 22. This enables the user of the portable scanning radio 1 to listen to the received signal. The portable scanning receiver includes squelch circuits 24 which receive a carrier present signal from detector 18 and also output a speaker control signal to audio amplifier 20. This enables the controller 26 to interpret when the presence of a received signal occurs and, appropriately, to control the audio amplifier output and to produce an audio signal output from speaker 22 whenever a radio frequency signal is received.

In the preferred embodiment controller 26 is a micro controller which includes a microprocessor, random access memory and read only memory. A keypad 30 is provided and is coupled to controller 36 for entering commands into the portable scanning receiver 1. Keypad 30 includes a light function input key, (not shown), which is also known as a light function input device. This device gives user access to a manual and an automatic display illumination mode of operation.

A liquid crystal display 32 is included to indicate the frequency of the received signal and also other functional status. Controller 26 outputs a digital signal to display 32 and causes the display to change the information being displayed. The display 32 further includes an icon, (not shown), which may be in the shape of a light bulb. The icon is activated and deactivated by the controller 26 to indicate the present mode of operation of the light function.

In the preferred embodiment a liquid crystal display is included because of the low power consumption. During daylight operation or in environments where there is adequate background light, it is easy for a user to read the characters or numerals displayed on display 32.

In the situation where there is insufficient ambient light for the user to read display 32, the preferred embodiment includes a incandescent lamp 36 positioned within the scanning receiver such that it illuminates display 32. A drive circuit 34 is provided to drive the relatively high current through incandescent lamp 36. The control of drive circuit 34 comes from a digital level signal from controller 26.

The portable scanning receiver 1 further includes timers 28. The timers are used to measure intervals of time. The timers are started by controller 26 and upon the expiration of the interval of time the timers 28 provide an output-signal back to controller 26 indicating the expiration of the time interval. In FIG. 1 the timers are shown as a separate functional block. However, in the preferred embodiment the timers are actually software routines run entirely within controller 26.

Figure 2:
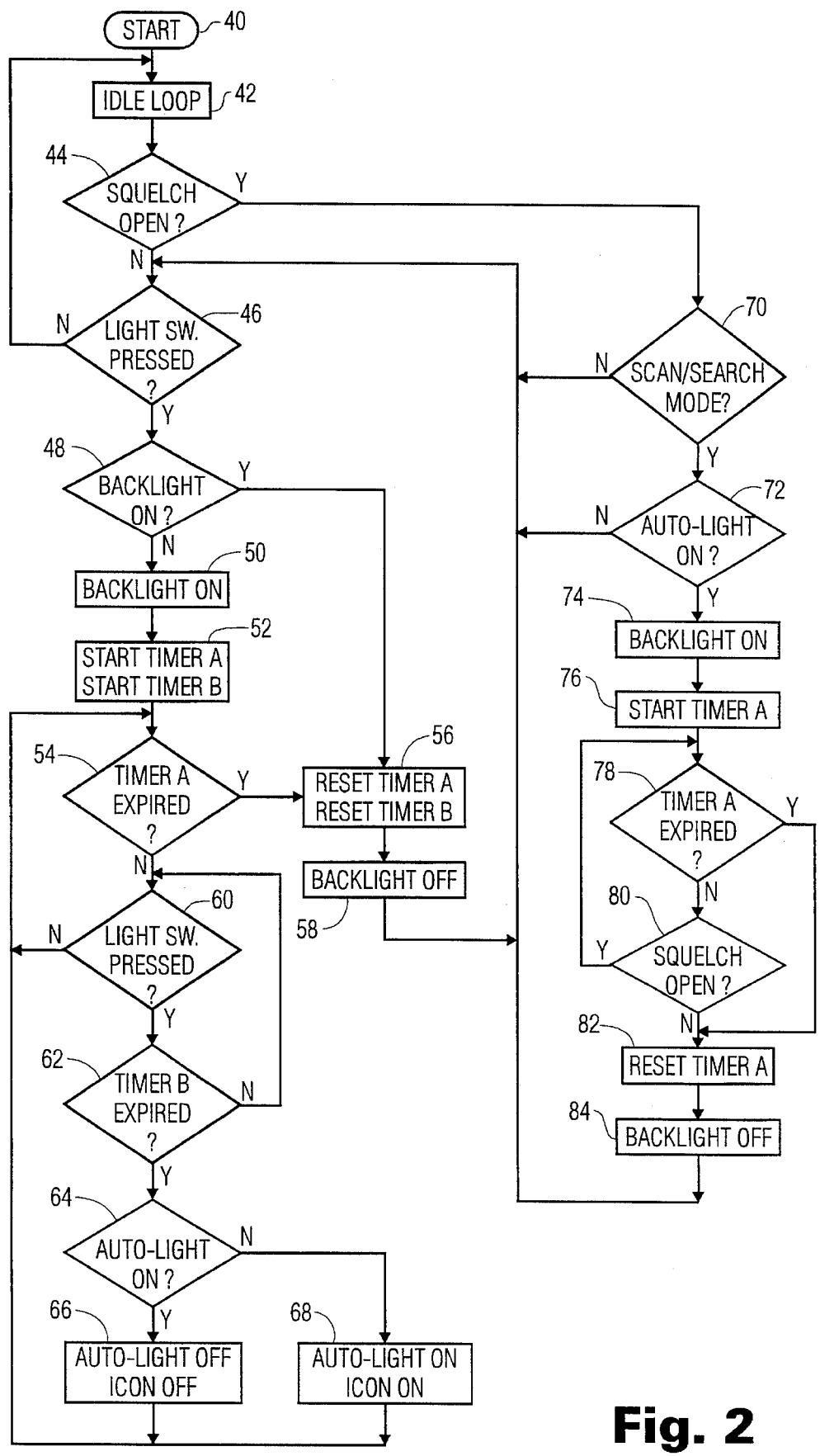
FIG. 2 is a software flow diagram of the automatic display illumination function in the preferred embodiment.

Reference is directed to FIG. 2 which is a software flow diagram for the display illumination functions in the preferred embodiment of the present invention. The software routine is entered at step 40 and proceeds into an idle loop 42. Within the idle loop the controller continually scans for a variety of the events to occur which may include keypresses or the reception of a signal or other functions.

At step 44, within the idle loop, the controller checks to see if the squelch signal has opened. This would indicate the presence of a received signal by the receiver. If a signal has not been received, then the controller proceeds to step 46 and tests to see if the light switch has been pressed. If the light switch has not been pressed the flow recirculates through the idle loop at step 42. In the foregoing way the controller proceeds through step 42, 44 and 46 and recirculates back continually until an event occurs which causes the controller to exit the idle loop.

In the preferred embodiment the user has the option to enable or disable the automatic display illumination feature. If at step 46, the user has pressed the light switch, then the controller proceeds to step 48 where it tests to see if the present condition of the backlight is the on state. If the backlight is not currently on then the controller turns the backlight on at step 50. Next, at step 52 the controller starts timer A and timer B. Timer A may be a ten second interval timer, for example. Timer B may be a three second interval timer, for example.

Returning to step 48, if the backlight is on then the controller proceeds to step 56 and resets both timer A and timer B. The timers are reset in the event that they are currently running their time interval at the instant the controller checks for the backlight on at step 48. After resetting timer A and timer B at step 56 the controller proceeds to step 58 and turns the backlight off. Subsequently, the controller returns to step 46 where it re-enters the idle loop as described earlier. The purpose for the backlight on test at step 48 and the resetting of timers A and B at step 56 and the turning off of the backlight in step 58 is to allow the user to turn off the backlight in the event the user does not wish to have the light on. In the automated sequence described in the preferred embodiment, the function focuses on the ability to turn the light on at appropriate times. However, the foregoing sequence of step 48, 56 and 58 provides for the manual turning off of the backlight.

Returning to step 52, after the controller has started timers A and B it proceeds to step 54 where it tests to see if timer A has expired. Timer A is a ten second timer which times the duration for which the display illumination will remain on. If the timer A has expired at step 54 then the controller proceeds to step 56 and resets timer A to zero and timer B to zero and subsequently turns the backlight off at step 58 and returns to the idle loop at step 46. The foregoing sequence of pressing the light switch, checking if the backlight is on, turning it on, starting the timers and waiting for the timers to expire in steps 46, 48, 50, 52 and 54 provides the function of allowing the user to touch the light switch once and thereby illuminating the backlight for a period of ten seconds as defined by timer A interval. This provides a manual mode of operation for illuminating the backlight.

Returning to step 54 if timer A has not yet expired the controller proceeds to step 60 where it again tests to see if the light switch is pressed. The purpose of this test is to see if the user is still depressing the light switch. If the user is not depressing the light switch, at step 60, then the controller returns to step 54 and again tests to see if timer A is expired. The controller will remain in this loop so long as the light switch is not pressed and timer A has not expired.

At step 60 if the light switch is pressed the controller proceeds to step 62 where it tests to see if timer B has expired. In the preferred embodiment timer B is a three second interval timer. If the timer has not expired at step 62 the controller recirculates to step 60 and again tests to see if the light switch is pressed. The purpose of the loop between step 60 and 62 is to determine if the user is pressing and holding the light switch down for a period of time greater than that interval defined by timer B. If at step 62 timer B has expired, while the user has held the light switch down, then the control proceeds to step 64 where the controller tests to see if the auto light function is currently on. If the auto light function is on then the foregoing sequence has instructed the controller to turn the auto light off which it does at step 66. In addition to turning the auto light function off the controller also turns off an icon on the display indicating the active state of the auto light function. Alternatively at step 64 if the auto light function was not presently on when that step was entered then the controller toggles the auto light function to the on condition at step 68 and activates the icon indicating to the user that the auto light function is then on. Control then recirculates to step 54 where the controller again reenters the loop testing if timer A has expired and the flow proceeds as described herein before.

The foregoing sequence of events allows the user to activate and deactivate the auto light function. Additionally, the foregoing sequence of events allows the user to turn the backlight on or off in a manual fashion.

Returning to step 44, where the controller tests to see if the squelch circuit is open in the preferred embodiment, if a yes indication occurs then the radio receiver has received a radio signal and the controller proceeds to step 70. It is to be understood that a test for squelch open at step 44 is only the preferred mode of testing for a received signal in the preferred embodiment of the present invention. Returning to step 70 the controller tests to see if a scan or search mode of operation of the scanning receiver is active. If neither a scan nor a search mode is active then the radio is receiving in the manual mode of operation and the auto light is not activated so the flow returns to step 46 where it returns to the idle loop. In the preferred embodiment, the display is not illuminated while in the auto light mode of operation, if the user has manually selected a received frequency. It is reasoned that the user knows the frequency of reception because it was manually selected, as opposed to being scanned or searched into.

Alternatively, at step 70 if the scan or search modes are active then the controller proceeds to step 72 where it checks to see if the auto light function is presently active. If the auto light function is not active then the controller returns to step 46 where it reenters the idle loop. Alternatively, at step 72 if the auto light function is active then the controller proceeds to step 74 where the backlight is illuminated. Next, the ten second timer, timer A is started at step 76. This timer defines the interval during which the display will remain illuminated by the backlight.

At step 78 the controller tests to see if the timer A has expired, if the timer has not expired then the controller proceeds to step 80 where it tests to see if the squelch is open. If the squelch is open the controller recirculates to step 78 where it again checks the expiration of timer A. The controller will remain in the loop circulating between step 78 and 80 until either timer A has expired at step 78, or the squelch is no longer open at step 80. In either case the flow will then continue to step 82 where timer A is reset and then to step 84 where the backlight is turned off. After step 84 the controller recirculates to step 46 where it reenters the idle loop. The foregoing sequence of steps, from 70 to 84, enable the scanning receiver in the preferred embodiment to automatically illuminate the display upon the receipt of a signal and leave the display illuminated for either a ten second timed period or until the squelch again closes whichever occurs first.

The automatic display illumination feature allows for the visual recognition of the received frequency by looking at the display of the receiver anytime a signal is received and the squelch is opened to produce sounds in the loud speaker. This mode of operation called the auto light mode, illuminates the display for a short period of time upon the receipt of a signal. It does not however, leave the display illuminated continuously and thereby reduces total current drain from the battery and extends battery life. This is a useful function when there is insufficient ambient light to allow the user to visually examine the display. Alternatively, if there is sufficient ambient light, or in daylight, then the user can deactivate the auto light function as described herein before and thereby totally eliminate any battery current drain as a result of display illumination. Finally, while in the manual mode of operation, the user is still enabled to activate the display illumination by briefly pressing the light switch which will cause the controller to illuminate the display for a period of time equivalent to the duration of timer A.

While the foregoing specification and drawings enable those skilled in this and related arts to practice the present invention in accordance with the preferred embodiment, the claimed invention encompasses a broader scope. Further modifications and improvements may occur which will make obvious manifold variants of the present invention. The claims appended hereunto are intended to read upon all such variants.

What is claimed is:

1. A method of illuminating a display in a receiver, the receiver having a light source for illuminating the display and a signal present output having a first state indicating the presence of a received signal the method comprising the steps of:

detecting the first state at the signal present output;

in response to detecting the first state illuminating said light source and starting a first timer defining a first time interval;

testing for the end of said first time interval and testing for continued detection of the first state at the signal present output; and upon detecting the end of said first time interval, or upon detecting the cessation of the first state at the signal present output, extinguishing said light source.

2. The method of claim 1, wherein said receiver has a light function input device for controlling a light function, further comprising the steps of:

testing for activation of the light function input device;

upon activation of said light function input device, starting a second timer defining a second time interval;

upon expiration of said second time interval, testing for continued activation of the light function input device, and upon detecting activation of the light function input device, toggling the light function between an automatic mode of operation and a manual mode of operation.

3. The method of claim 2, wherein the display comprises an icon, further comprising the steps of:

activating a first and second state of said icon according to the mode of operation of said light function.

4. A receiver for receiving signals, comprising:

a display;

a light source for illuminating said display;

a received signal indicator having an output indicative of the presence of a received signal and indicative of the absence of a received signal;

a first timer for timing a first time interval, said first timer having an output for outputting a signal indicative of the expiration of said first time interval; and a controller coupled to said display for displaying information thereon, said controller operably coupled to said light source for illuminating and extinguishing said light source, said controller coupled to said first timer for starting said first timer, and further coupled to said output of said first timer, and said controller coupled to said received signal indicator output, such that when said received signal indicator output indicates the presence of said received signal, said controller illuminates said light source and starts said first timer, said controller illuminating said light source until said received signal indicator indicates the absence of a signal, or until said first timer output indicates said expiration of said first time interval.

5. The receiver in claim 4, further comprising:

a light function input device operably coupled to said controller, and having an activated state; and wherein activation of said light function input device for more than a second time interval causes said controller to toggle a light function routine between a manual mode and an automatic mode of operation.

6. The receiver of claim 5, further comprising:

an icon in said display having a first and second state wherein said first state indicates said manual mode and said second state indicates said automatic mode of operation of said light function routine; and wherein said controller activates said first and second state of said icon according to the presently operable mode of operation of said light function routine.

\* \* \* \* \*